United States Patent [19]

Toide et al.

[11] Patent Number: 5,582,473
[45] Date of Patent: Dec. 10, 1996

[54] PROJECTION DISPLAY APPARATUS

[75] Inventors: Eiichi Toide; Hidehiko Hori, both of Nagaokakyo, Japan

[73] Assignee: Mitsubishi Denki Kabushiki Kaisha, Tokyo, Japan

[21] Appl. No.: 463,778

[22] Filed: Jun. 5, 1995

[30] Foreign Application Priority Data

| Jul. 22, 1994 | [JP] | Japan | 6-171437 |
| Jan. 10, 1995 | [JP] | Japan | 7-001909 |
| Jan. 24, 1995 | [JP] | Japan | 7-008770 |
| Apr. 6, 1995 | [JP] | Japan | 7-081320 |

[51] Int. Cl.$^6$ .......................... G03B 21/10; G03B 21/56
[52] U.S. Cl. .............. 353/74; 353/38; 359/457; 359/454
[58] Field of Search .................. 353/38, 74, 77, 353/78, 76; 359/446, 449, 454, 455, 456, 460, 461, 457

[56] References Cited

U.S. PATENT DOCUMENTS

| 2,780,136 | 4/1957 | Erban | 359/454 |
| 3,473,862 | 10/1969 | Hauber et al. | 359/446 |
| 3,610,728 | 10/1971 | Firth | 359/446 |
| 3,640,602 | 2/1972 | Wolfe | 359/446 |
| 4,143,943 | 3/1979 | Rawson | 359/446 |
| 4,941,036 | 7/1990 | Itoh . | |
| 5,408,282 | 4/1995 | Nagashima et al. | 359/456 |

FOREIGN PATENT DOCUMENTS

| 61-116303 | 7/1986 | Japan . |
| 6428068 | 2/1989 | Japan . |
| 1196001 | 8/1989 | Japan . |
| 5333431 | 12/1993 | Japan . |

*Primary Examiner*—William Dowling

[57] ABSTRACT

A projection display apparatus comprises a compact CRT, a projecting lens for projecting an enlarged image of the CRT, a Fresnel lens having a converging effect, a lenticular sheet as a diffusing plate. An image that has been enlarged by the projecting lens and passed through the lenticular Fresnel lens is formed on the lenticular sheet. The apparatus further comprises a displacing mechanism for displacing the Fresnel lens, and a display mechanism for displaying information related to the direction and extent of displacement of the Fresnel lens displaced by the displacing mechanism.

29 Claims, 12 Drawing Sheets

PROJECTION DISPLAY APPARATUS

BACKGROUND OF THE INVENTION

This invention relates to a rear-projection type projection display apparatus that projects a picture from the rear of a screen, and allows it to be viewed from the front of the screen.

A projection display apparatus having a mechanism for projecting a bright picture for viewing by a viewer not directly in front of a screen is disclosed, for example, in Japanese Utility Model Kokai Publication No. 116303/1986, Japanese Utility Model Kokai Publication No. 28068/1989 and Japanese Patent Kokai Publication No. 196001/1989. According to the apparatus described in these publications, a bright picture is presented to a viewer looking down on the screen from above or up at the screen from below by displacing a Fresnel lens up and down, this Fresnel lens being moved either independently or in conjunction with a diffusing plate.

However, according to the aforementioned conventional projection display apparatus, the Fresnel lens can move only up and down, and cannot move to the left and right. A bright picture, therefore, could not be presented to a viewer standing to the left or right of the screen.

Moreover, in the aforesaid conventional projection display apparatus, no means was provided to indicate the direction in or the extent to which the Fresnel lens should be displaced, and it was sometimes troublesome to make the adjustments necessary to move it to the optimum position.

SUMMARY OF THE INVENTION

It is therefore an object of this invention to provide a projection display apparatus that, by means of a simple operation, can present a bright picture to a viewer even if the viewer is not directly in-front of the screen.

According to one aspect of the present invention, a projection display apparatus comprises: a picture source; a projecting lens for projecting an enlarged image of the picture source; a Fresnel lens having a converging effect; a diffusing plate on which an image that has been enlarged by the projecting lens and passed through the Fresnel lens is formed; a displacing mechanism for displacing the Fresnel lens; and a display mechanism for displaying information related to the direction anti extent of displacement of the Fresnel lens displaced by the displacing mechanism. In this apparatus, by displacing a Fresnel lens with a displacing mechanism, the brightest picture can be viewed even though the viewer is not directly in front of a screen. Moreover, the apparatus also has a function for displaying information relating to the direction and extent of displacement of the lens. Without moving himself, therefore, the viewer can visually recognize the direction and extent of displacement of the Fresnel lens, i.e. he can recognize in what direction and by how much the central light beam of the apparatus has moved, and can perform a simple operation to observe a bright picture.

According to another aspect of the present invention, a projection display apparatus comprises: a picture source; a projecting lens for projecting an enlarged image of the picture source; a Fresnel lens having a converging effect; a diffusing plate on which an image that has been enlarged by the projecting lens and passed through the Fresnel lens is formed; and a displacing mechanism for displacing a part of the Fresnel lens facing the diffusing plate in a plane parallel to the diffusing place in both a left-right direction parallel to the horizontal direction, and an up-down direction perpendicular to the horizontal direction. In this apparatus, the displacing mechanism displaces a part of a Fresnel lens adjacent to the diffusing plate in left-right and up-down directions in a plane parallel to the diffusing plate. The Fresnel lens can therefore be displaced in mutually perpendicular directions, and the brightest picture can be viewed whether the viewer is looking down on a screen from above or up at the screen from below, or looking at the screen obliquely from the left or right.

According to still another aspect of the present invention, a projection display apparatus comprises: a picture source; a projecting lens for projecting an enlarged image of the picture source; a Fresnel lens having a converging effect; a diffusing plate on which an image that has been enlarged by the projecting lens and passed through the Fresnel lens is formed on; a displacing mechanism for displacing a part of the Fresnel lens facing the diffusing plate in a plane parallel to the diffusing plate, either in a left-right direction parallel to the horizontal direction or in an up-down direction perpendicular to the horizontal direction, or in both of these directions; and a transparent plate. The Fresnel lens is enclosed between the transparent plate and the diffusing plate and the Fresnel lens slides on the transparent plate when it is displaced. In this apparatus, since a Fresnel lens in the form of a sheet, is enclosed between a transparent plate and a diffusing plate, there is no creasing of the Fresnel lens when it is displaced, and good picture quality is guaranteed.

According to yet another aspect of the present invention, a projection display apparatus comprises: a cabinet; picture source provided in the cabinet; a projecting lens for projecting an enlarged image of the picture source; a Fresnel lens having a converging effect; a diffusing plate on which an image of a picture that has been enlarged by the projecting lens and passed through the Fresnel lens is formed; a pair of supports provided above and below or to the left and right of the diffusing plate in the cabinet for the purpose of guiding the Fresnel lens; a pair of rollers provided at the rear of the cabinet for the purpose of winding the Fresnel lens guided by the supports; and a drive mechanism For rotating the rollers. In this apparatus, since a pair of supports at the top and bottom or left and right of a diffusing plate are provided inside a cabinet for the purpose of guiding a Fresnel lens, and a pair of rollers are provided inside the cabinet at its rear For winding the Fresnel lens guided by the supports, the height and breadth or the cabinet can be made smaller.

According to yet another aspect of the present invention, a projection display apparatus comprises: a picture source; a projecting lens for projecting an enlarged image of the picture source; a Fresnel lens Forming a part of a screen and having a converging effect; a diffusing plate forming a part of the screen, an image that has been enlarged by the projecting lens and passed through the Fresnel ions being formed on the diffusion layer; displacing mechanism For displacing a part of the Fresnel lens facing the diffusing plate in a plane parallel to the diffusing plate, either in a left-right direction parallel to the horizontal direction or in an up-down direction perpendicular to the horizontal direction, or in both of these directions; one pair or a plurality of light detecting members disposed behind, the Fresnel lens at symmetrical positions about a predetermined reference position, the detecting members outputting signals of which the magnitude depends on the intensity of infrared rays incident upon them; computing means for determining the direction and extent of displacement of the Fresnel lens to be displaced by the displacing mechanism based on the difference of magnitude of signals output by the light detecting members when infrared rays are emitted from the infrared ray controller; and controlling means for controlling the action of the displacing mechanism based on the direction and extent of displacement obtained by the computing means In this apparatus, by means of an infrared ray controller, a viewer can direct a bright picture toward himself by performing a simple operation such as, for example, adjusting sound volume or selecting a channel.

According to yet either aspect of the present invention a projection display apparatus comprises: a first picture source; a second picture source; and a third picture source; the first to third picture sources being arranged horizontally in this order. The apparatus further comprises: a first projecting lens for projecting an enlarged image off the first picture sources; a second projecting lens for projecting an enlarged image of the second picture sources; a third projecting lens for projecting an enlarged image of the third picture sources; a Fresnel lens forming part of a screen and having a converging effect; a diffusing plate forming part of the screen, an image that has been enlarged by the projecting lens and passed through the Fresnel lens being formed on the diffusion layer; displacing mechanism for displacing a part of the Fresnel lens facing the diffusing plate in a plane parallel to the diffusing plate, either in a left-right direction parallel to the horizontal direction or in an up-down direction perpendicular to the horizontal direction, or in both of these directions; one pair or a plurality of light detecting members disposed behind the Fresnel lens at symmetrical positions about the second projecting lens, the light detecting members outputting signals of which the magnitude depends on the intensity of infrared rays incident upon them; computing means for determining the direction and extent of displacement off the Fresnel lens to be displaced by the displacing mechanism based on the difference of magnitude of signals output by the light detecting members when infrared rays are emitted from the infrared ray controller; and controlling means for controlling the action of the displacing mechanism based on the direction and extent of displacement obtained by the computing means. In this apparatus, even in the apparatus incorporating a projecting optical system corresponding to a plurality of colors, a viewer can direct projected light of a plurality of colors toward himself.

According to yet another aspect of the present invention, a multi-display apparatus comprises a plurality of projection display apparatuses according to any one of the above-mentioned construction arranged such that their screens are aligned in the same plane. In this multi-display apparatus assembly, the directions of central light beams of the individual apparatuses can be controlled, so unevenness off brightness in each display apparatus can be eliminated.

DETAILED DESCRIPTION OF THE INVENTION

First Embodiment

Figure 1:
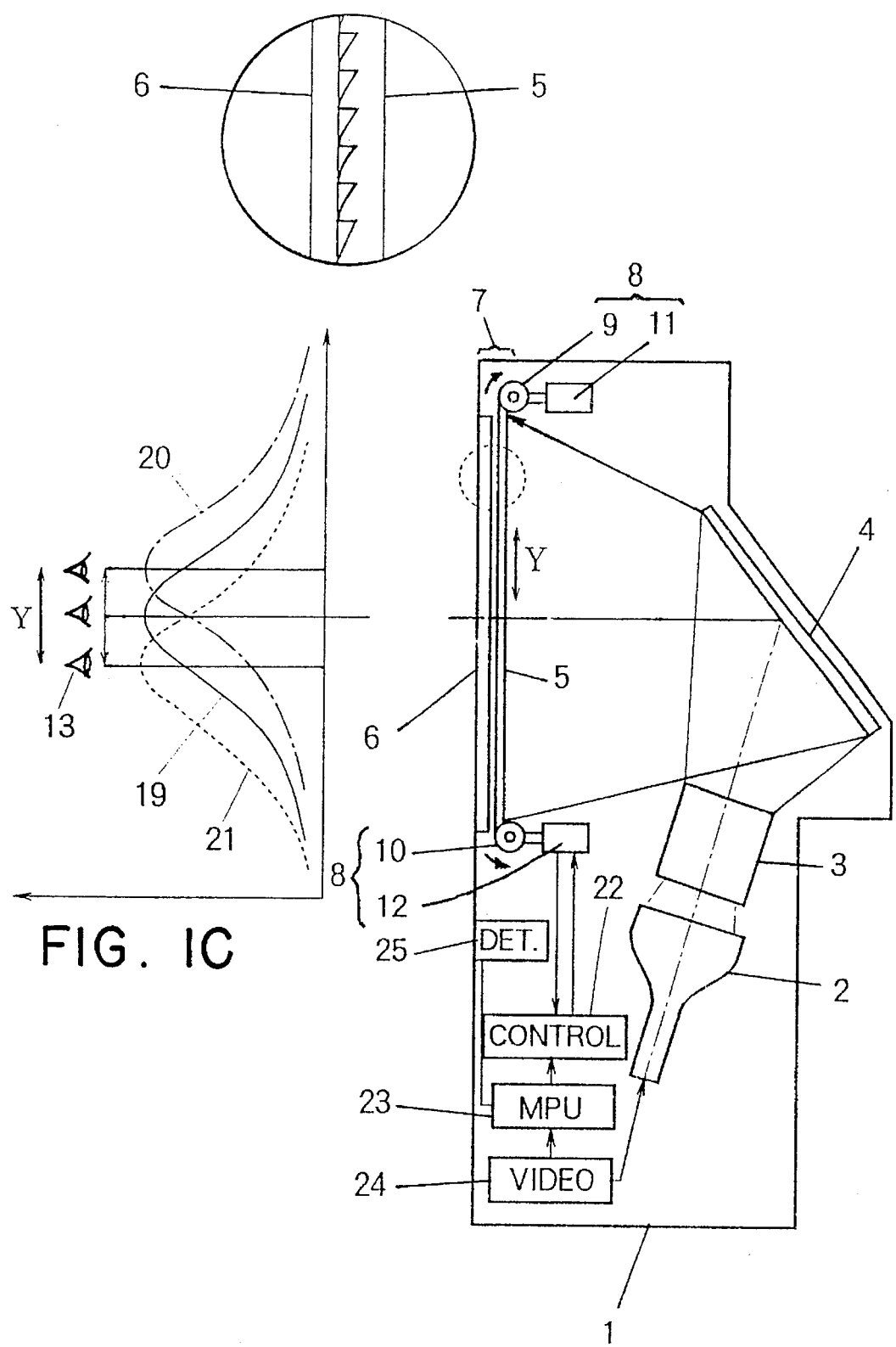
FIG. 1A–C are schematic diagrams of the construction of a projection display apparatus according to a first embodiment of this invention.

FIGS. 1A and 1B show the construction of a projection display apparatus according to the first embodiment of this invention. As shown in FIGS. 1A and 1B, the projection display apparatus according to the first embodiment comprises a picture source 2 such as a compact CRT or liquid crystal, a projecting lens 3 for projecting an enlarged image of the picture source 2, a mirror 4 for reflecting light that has passed through the projecting lens 3 and directing it to the front of the apparatus (the left-hand side of FIG. 1A), a Fresnel lens 5 for making incident divergent light into an effectively parallel light, and a diffusing plate 6 such as a lenticular sheet for diffusing the light so as to obtain a wide angle of field. The diffusing plate 6 and Fresnel lens 5 together form a screen 7 for displaying the picture. In the apparatus according to the first embodiment having this construction, light emerging from the picture source 2 passes through the projecting lens 3, is reflected by the mirror 4, and after being converted to an effectively parallel light by the Fresnel lens 5, forms an image on the diffusing plate 6.

As shown in FIG. 1A, the apparatus according to the first embodiment comprises a displacing mechanism 8 that displaces a part of the Fresnel lens facing the diffusing plate 6 in an up-down direction (Y direction) in a plane parallel to the diffusing plate 6. The displacing mechanism 8 comprises a pair of rollers 9 and 10 disposed above and below the diffusing plate 6 that wind the film-like Fresnel lens 5, and drive mechanisms 11 and 12 comprising a motor and gears that rotate these rollers 9 and 10. In the apparatus according to the first embodiment having this construction, the drive mechanism 11 or 12 winds the film-like Fresnel lens 5 by rotating the rollers 9 and 10 while applying a predetermined tension to the Fresnel lens 5. The part of the Fresnel lens 5 adjacent to the diffusing plate 6 is then displaced in the up-down direction parallel to the diffusing plate 6.

Figure 2:
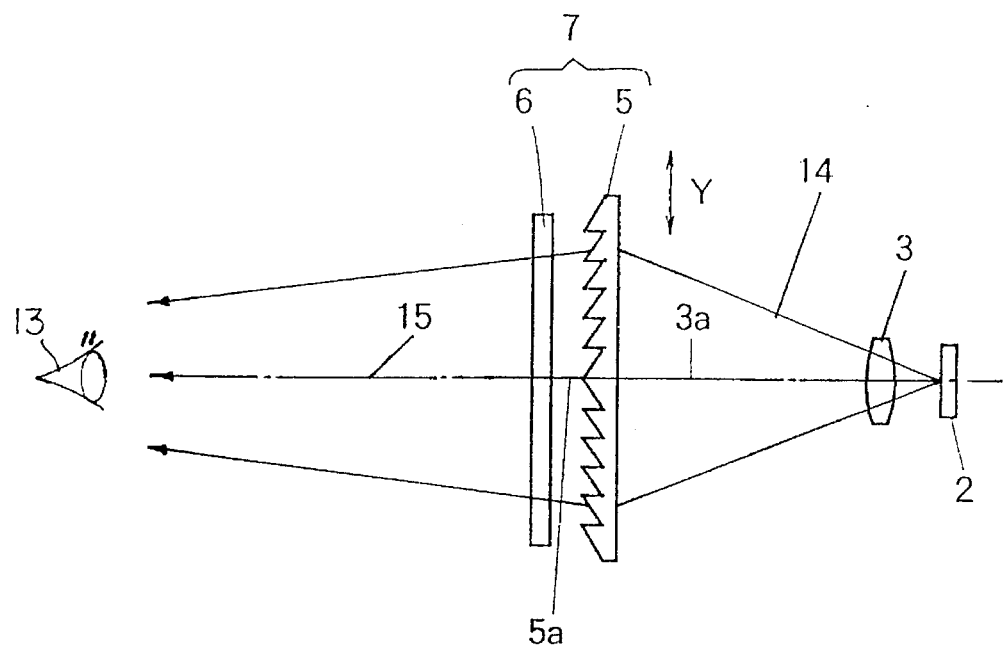
FIG. 2 is an illustrative diagram showing the effect of a Fresnel lens according to the first embodiment.
Figure 3:
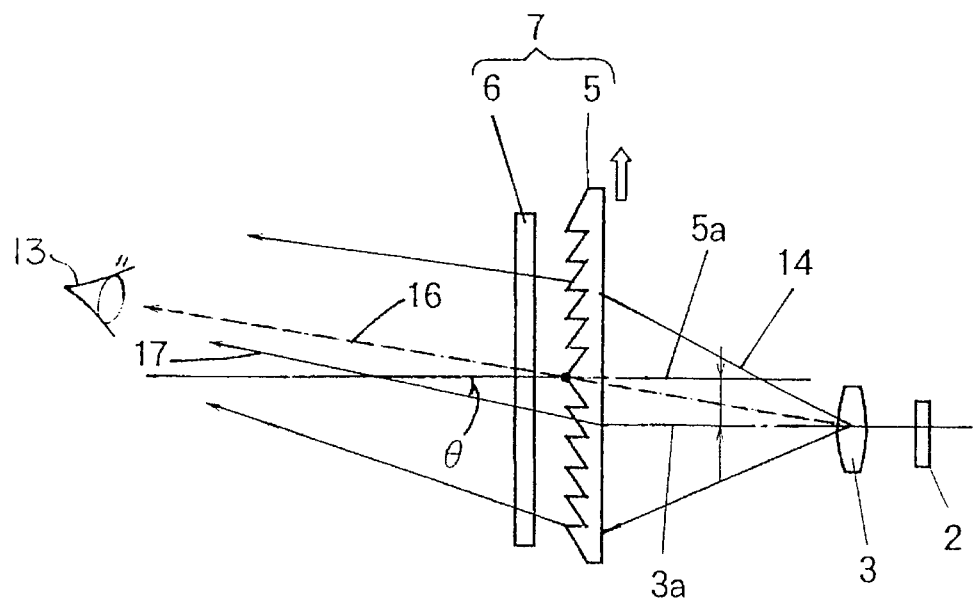
FIG. 3 is an illustrative diagram showing the effect of displacement of the Fresnel lens according to the first embodiment.

FIG. 2 is an illustrative diagram showing the effect of the Fresnel lens 5, and FIG. 3 is an illustrative diagram showing the effect of displacement of the Fresnel lens 5. As shown in FIG. 2, when a viewer 13 is directly in front of the diffusing plate 6 of the screen 7, the optical axis 5a of the Fresnel lens 5 that passes through the center point of the Fresnel lens 5, coincides with the optical axis 3a of the projecting lens 3. A central ray 15 of a projected light beam 14 then emerges perpendicular from the diffusing plate 6 so as to reach the viewer 13.

According to the first embodiment, when the viewer 13 looks down at the screen 5 from above, the Fresnel lens 5 is displaced upwards so that the optical axis 5a of the Fresnel lens 5 is above the optical axis 3a of the projecting lens 3, as shown in FIG. 3. As a result, the projected light 14 from the projecting lens 3 is diffused by the diffusing plate 6, but instead of a central ray 16 travelling perpendicular to the diffusing plate 6, this ray travels in a direction joining the center of the projecting lens 3 and the center of the Fresnel lens 5 (broken line in the figure). Hence, in FIG. 3, the brightest ray on the optical axis 3a of the projecting lens 3 is diverted upwards by the Fresnel lens 5 that has been displaced upwards (to become a ray 17) which emerges in the direction of the central ray 16. Therefore, the viewer 13 looking down on the screen 7 (at a viewing angle θ), although not directly in front of the screen 7, can view the brightest image. A relative brightness distribution 19 when the Fresnel lens 5 is in a predetermined initial position corresponding to FIG. 2, a relative brightness distribution 20 when the Fresnel lens 5 has been displaced upwards, and a relative brightness distribution 21 when the Fresnel lens 5 has been displaced downwards, are shown FIG. 1C.

Figure 4:
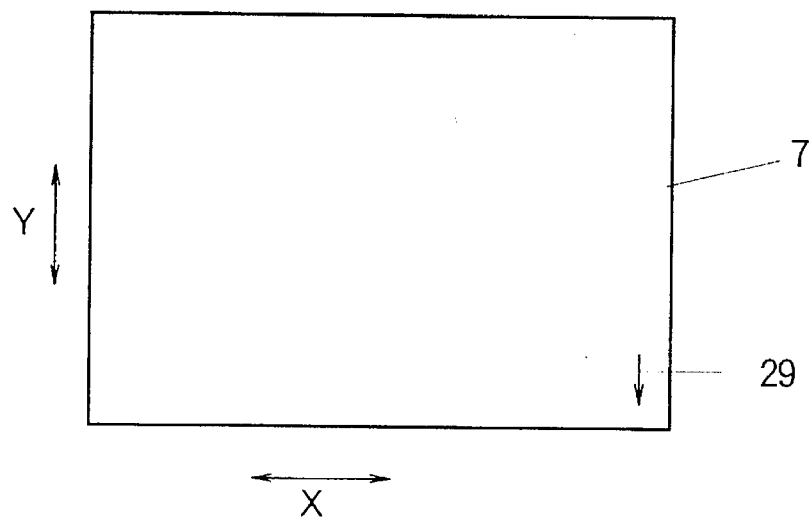
FIG. 4 is a diagram showing a typical display of information related to the direction and extent of displacement of the Fresnel lens according to the first embodiment.

The projection display apparatus of the first embodiment further comprises a display function for displaying information related to the direction and extent of displacement of the Fresnel lens 5 displaced by the displacing mechanism 8, for example, by means of an arrow 29 on the screen 7, as shown in FIG. 4. The apparatus of the first embodiment comprises a control circuit 22 that controls the action of the drive mechanisms 11 and 12 (although not shown in FIG. 1, the control circuit 22 is connected to the drive mechanism 11 as well as the drive mechanism 12), a microprocessor (MPU) 23 that receives information related to the direction and extent of displacement of the Fresnel lens 5, and a video circuit 24 for displaying the arrow 29 at a predetermined position on the picture source 3 based on a command from the microprocessor 23. The apparatus of the first embodiment also comprises a light detector 25 that detects an infrared ray signal when various commands including information about the action of the drive mechanisms 11 and 12, are transmitted from an infrared ray controller which is a remote control device, and relays these commands to the microprocessor 23. The position of the arrow 29 may be chosen freely, but it is preferably in a position that does not interfere with the viewing of the original picture. In this way, from the orientation and length of the arrow 29 for example, the viewer 13 can visually recognize the current direction and extent of displacement of the Fresnel lens 5, i.e. without moving himself, the viewer can appreciate in what direction and by how much the central ray of the apparatus (15 in FIG. 2 or 16 in FIG. 3) has been displaced.

Figure 5:
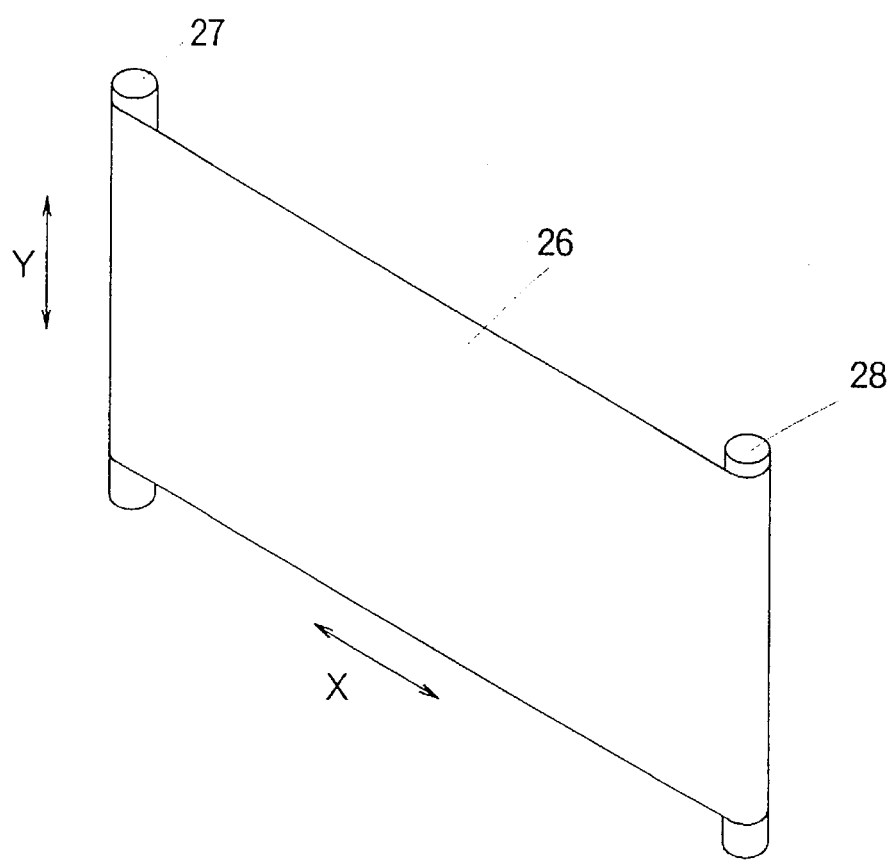
FIG. 5 is a perspective view of essential parts wherein a Fresnel lens can be displaced to the left and right according to the apparatus of the first embodiment.

In the aforesaid description, the Fresnel lens 5 can be displaced only in the up-down direction (Y direction), however a sheet-like Fresnel lens 26 that can be displaced in the left-right direction (X direction) by the rotation of rollers 27 and 28 may be provided instead of the Fresnel lens 5 as shown in FIG. 5. In this case, the viewer can still see a bright picture even if he looks at, the screen obliquely from the left or right.

Figure 6:
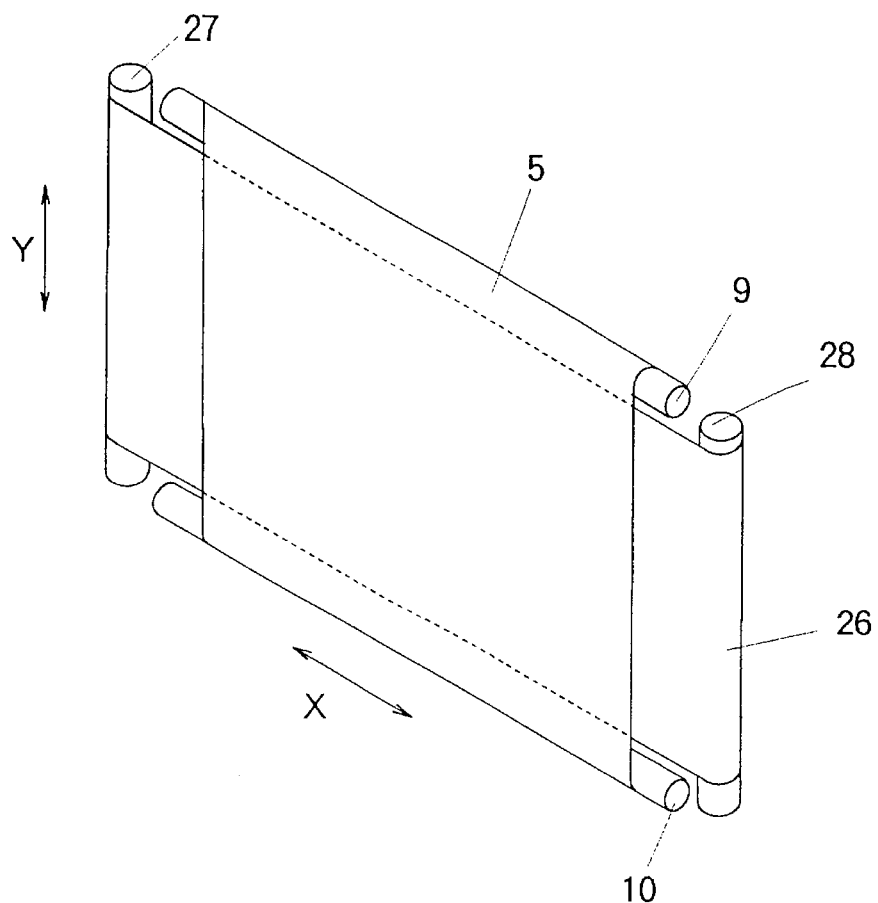
FIG. 6 is a perspective view of essential parts where two Fresnel lenses are provided according to the apparatus of the first embodiment.
Figure 7:
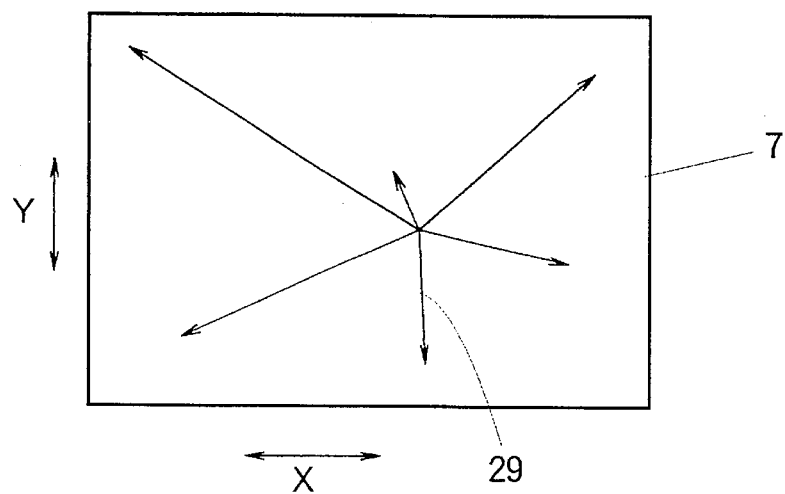
FIG. 7 is a diagram showing typical information related to the direction and extent of displacement of a Fresnel lens according to the first embodiment.

The sheet-like Fresnel lens 26 that can be displaced in the left-right direction (X direction) may also be provided in addition to the Fresnel lens 5, as shown in FIG. 6. In this ease, the viewer can see a bright picture whether he is looking down on the screen from above, looking up at the screen from below, or looking at the screen obliquely from the left or right. In the case of FIG. 6, the directions and extents of displacement of the Fresnel lenses 5 and 26 may for example be indicated by one of the arrows 29 in FIG. 7. Herein, the orientation of the arrow 29 shows the direction in which the current Fresnel lens has moved relative to a reference position, and the length of the arrow 29 corresponds to the extent of displacement.

In the aforesaid description, the directions and extents of displacement of the Fresnel lenses 5 and 26 were expressed by means of arrows, but other display means may be used such as for example, displaying the centers of the Fresnel lenses 5 and 26 as dots.

Second Embodiment

Figures 8A, 8B:
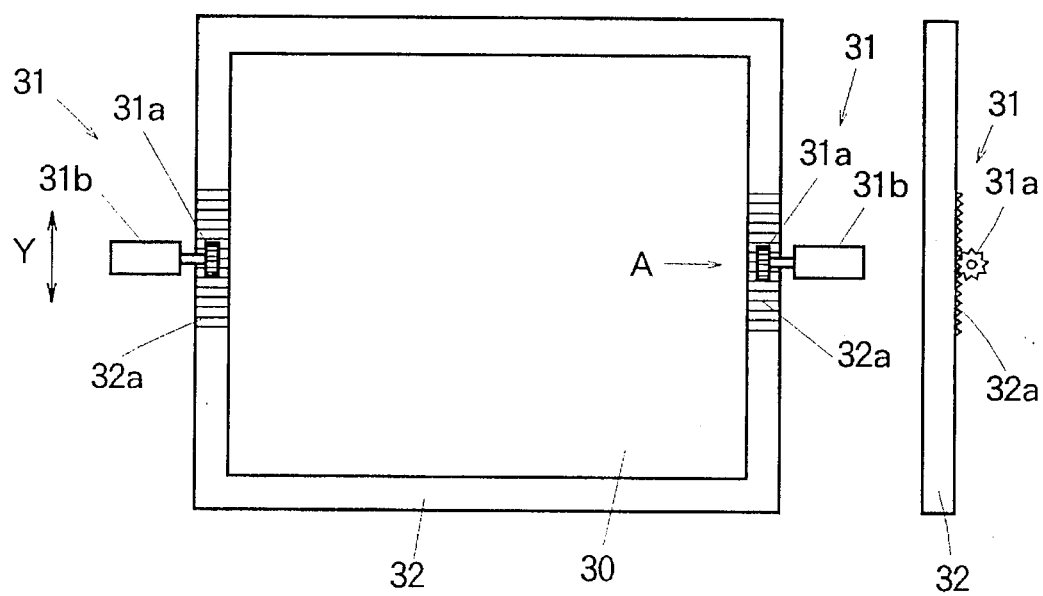
FIG. 8A is a schematic front view of a screen of projection display apparatus according to a second embodiment of this invention, and its drive mechanism.
FIG. 8B is a view of FIG. 8A from a direction A.

FIGS. 8A and 8B schematically shows a screen 30 and its' drive mechanism 31 in a projection display apparatus according to a second embodiment of the invention. FIG. 8A is a front view, and FIG. 8B is a side view of FIG. 8A along the direction A. In the apparatus according to the second embodiment, only the construction of the screen 30 and the drive mechanism 31 are different from that of the first embodiment. More specifically, according to the second embodiment, the outer circumference of the screen 30 consisting of the Fresnel lens and diffusing plate, is fixed to an outer frame 32. The drive mechanism 31 that drives the screen 30 comprises driven gears 32a formed on the outer frame 32, drive gears 31a that engage with the driven gears 32a, and motors 31b that rotate the drive gears 31a. According to the second embodiment when the drive gears 31a are rotated by the motors 31b, the outer frame 32 provided with the driven gears 32a that engage with the drive gears 31a is displaced in the up-down direction (Y direction). The remaining features of the second embodiment are identical to those of the first embodiment.

In FIG. 8A, the case has been described where the drive mechanisms 31 were provided at two positions to the left and right of the outer frame 32, but the drive mechanism may be provided at only one position.

Figure 9:
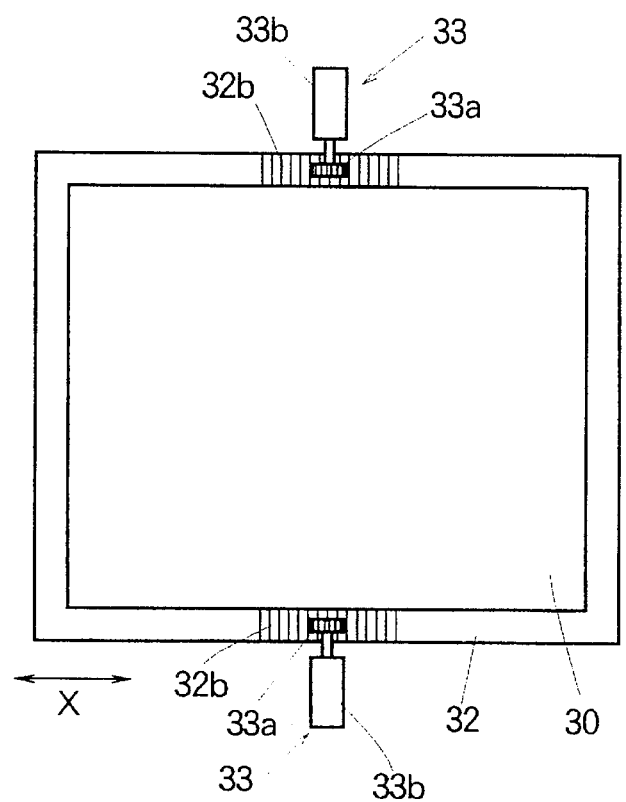
FIG. 9 is a front view showing another form of the projection display apparatus according to the second embodiment.

Further, drive mechanisms 33 comprising driven gears 32b, drive gears 33a that engage with the driven gears 32b and motors 33b that rotate the drive gears 33a, may be provided at the top and bottom of the outer frame 32 so that the screen can be displaced in the left-right direction (X direction), as shown in FIG. 9.

Figure 10:
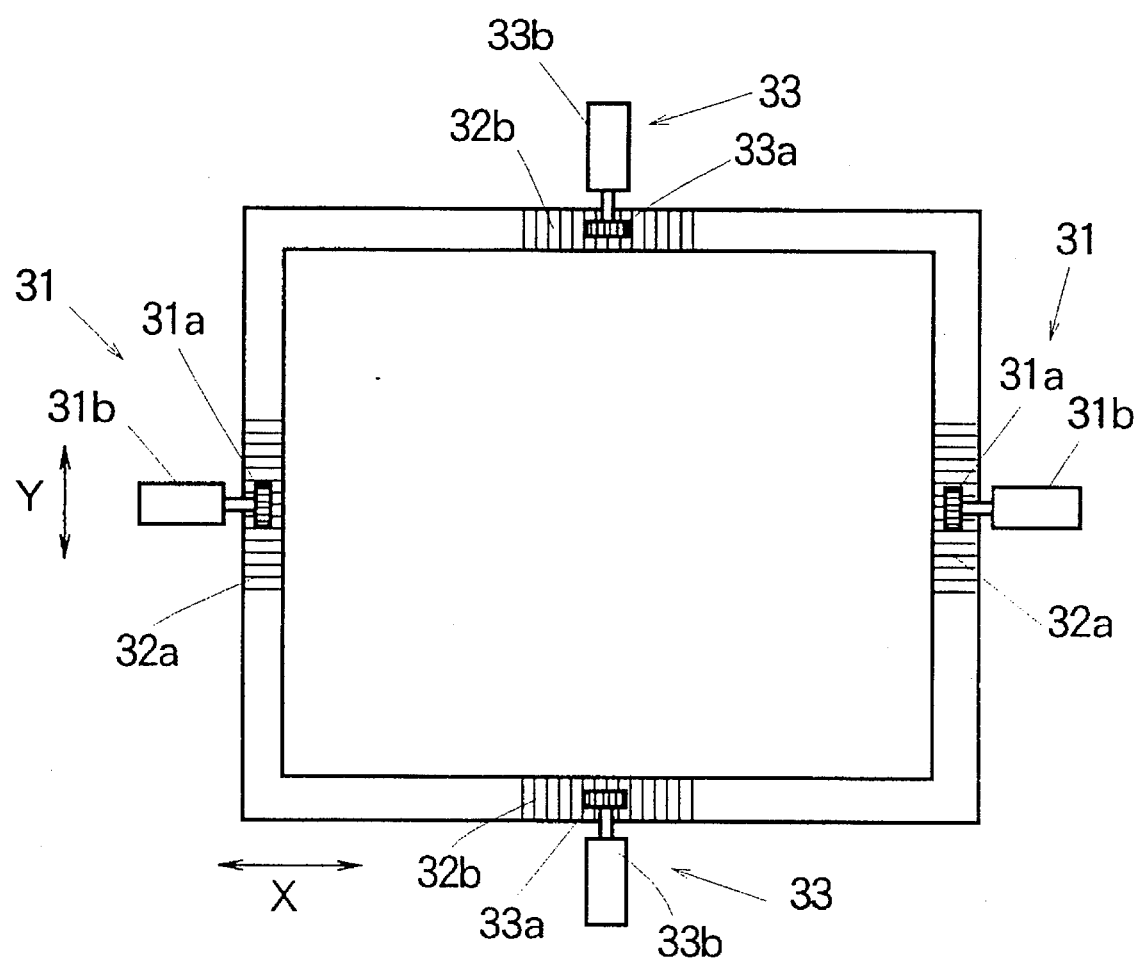
FIG. 10 is a front view showing yet another form of the projection display apparatus according to the second embodiment.

Moreover, the drive mechanisms 33 and 31 may be provided at the top, bottom, left and right of the outer frame 32 so that the screen 30 can be displaced in the up-down and left-right directions, as shown in FIG. 10.

Third Embodiment

Figure 11A:
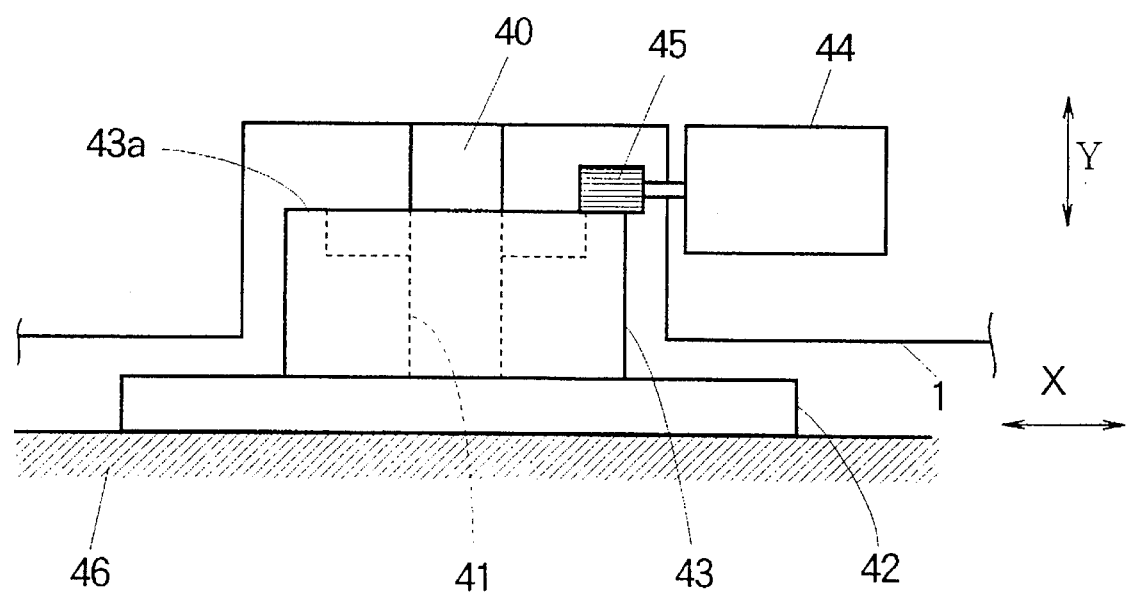
FIG. 11A is a schematic view of the essential parts a projection display apparatus according to a third embodiment of this invention.
Figure 11B:
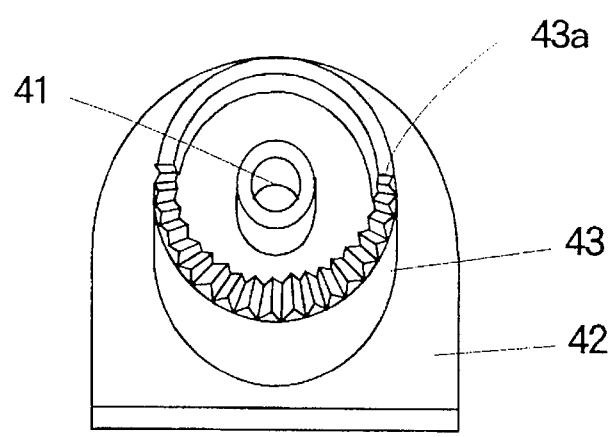
FIG. 11B is a perspective view of the essential part of FIG. 11A.

FIGS. 11A and 11B are respectively a schematic front view and a perspective view of essential parts showing the construction of a projection display apparatus according to a third embodiment of this invention. In the apparatus according to the third embodiment, the only difference from the aforesaid first embodiment is that the position of the Fresnel lens can be varied by rotating a cabinet 1.

The apparatus according to the third embodiment comprises a pivot shaft 40 fixed at the center of the base of the cabinet 1, and a pedestal 42 having a hole 41 into which the shaft 40 is inserted such that the shaft 40 is free to rotate. Due to this construction, the cabinet 1 is supported such that it is free to rotate relative to the pedestal 42. The pedestal 42 comprises a cylindrical piece 43 that is concentric with the hole 41 and carries an annular driven gear 43a on its upper part. A drive gear 45 attached to a shaft of a motor 44 fixed to the cabinet 1, engages with the gear 43a. According to the aforesaid construction, when the motor 44 is operated so as to rotate the drive gear 45, due to the engaging of the gear 45 and the annular driven gear 43a, a force acts tending to rotate the pedestal 42. However, due to friction with a base 46 under the weight of the cabinet 1, the pedestal 42 cannot move, hence the cabinet 1 rotates about the shaft 40 due to the reaction. The projection display apparatus therefore rotates together with the cabinet 1, and the screen can be oriented toward the left or right as a result. The remaining features of the third embodiment are identical to those of the aforesaid first embodiment.

Fourth Embodiment

Figure 12:
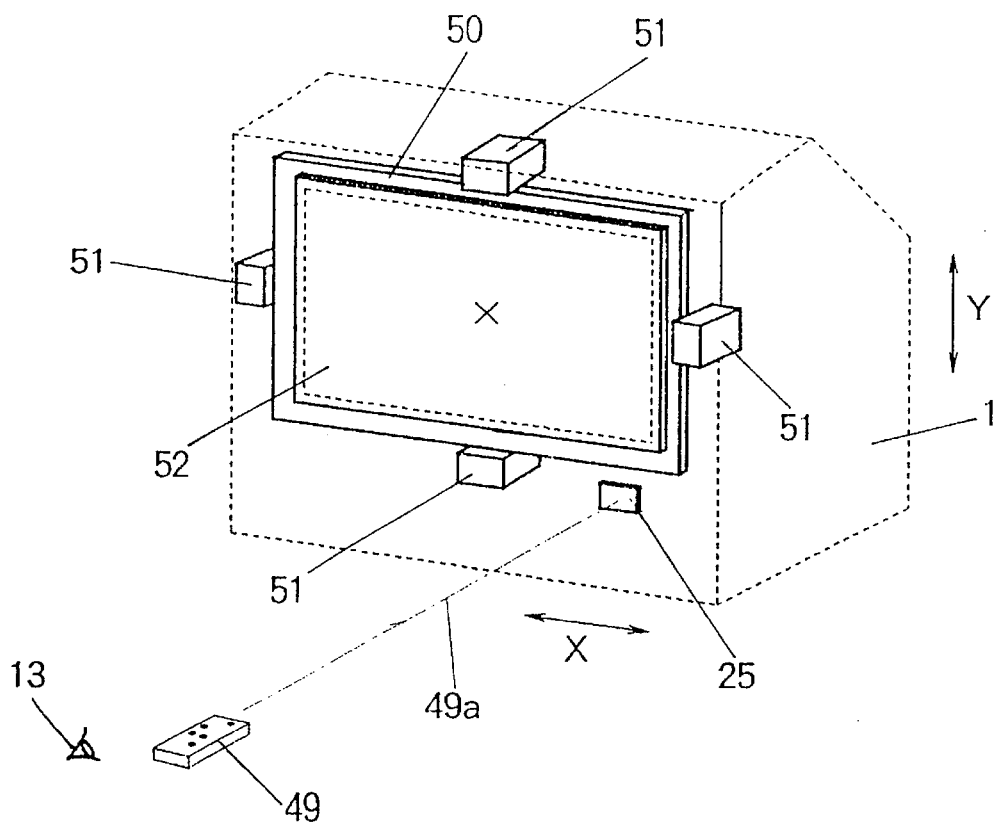
FIG. 12 is a schematic view of the construction of a projection display apparat;us according to a fourth embodiment of this invention.

FIG. 12 is a schematic perspective view of the construction of a projection display apparatus according to a fourth embodiment of this invention. In the apparatus according to the fourth embodiment., a drive mechanism 51 is provided in at least one position (four positions in FIG. 12) on the edge of a plate-like Fresnel lens 50 of thickness approx. 1 [mm]. The mechanism 51 may consist of a press screw of which the tip comes into contact with the edge of the Fresnel lens 50, or a spring mechanism or the like. Alternatively, the same construction as that of FIG. 10 may be adopted. Further, the diffusing plate 52 is fixed to the cabinet 1 so it cannot move. In this case, the Fresnel lens 50 has a surface area exceeding that of the diffusing plate 52 by an amount equal to the displacement. Therefore, even if the Fresnel lens 50 is displaced up or down for example, rays that form the lower part of the picture in the projected light pass through the Fresnel lens plate, so there is no scattering of rays or missing parts in the picture.

Figure 13:
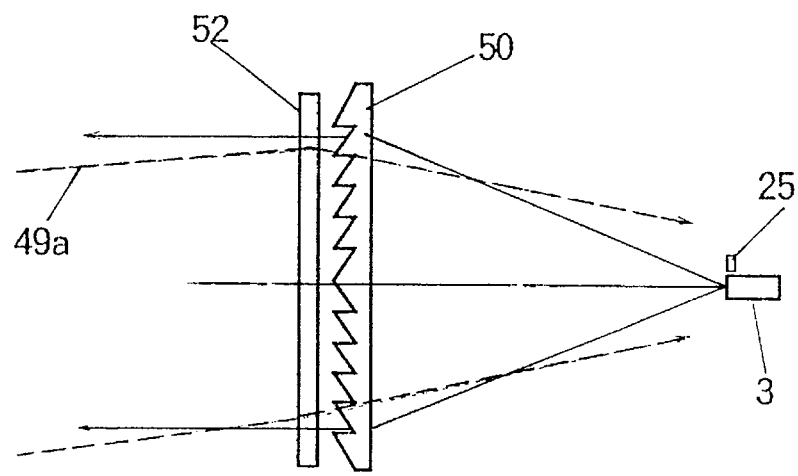
FIG. 13 is a diagram of another example of the position of a light detector according to the fourth embodiment.

Further, in FIG. 12, the light detector 25 is situated below the screen, however it may also be disposed near the projecting lens 3 as shown in FIG. 13. If this arrangement is adopted, infrared rays 49a from an infrared ray controller 49 are effectively converged by the Fresnel lens 50 in an opposite direction to that of the projected light so as to irradiate the area surrounding the detector 25, and the detector 25 detects part on the infrared rays. An infrared ray beam incident on the wide area screen can therefore be effectively converged and utilized so that the displacement of the lens can be controlled even from a long distance away. The remaining features of the fourth embodiment are identical to those of the first embodiment.

Fifth Embodiment

Figure 14:
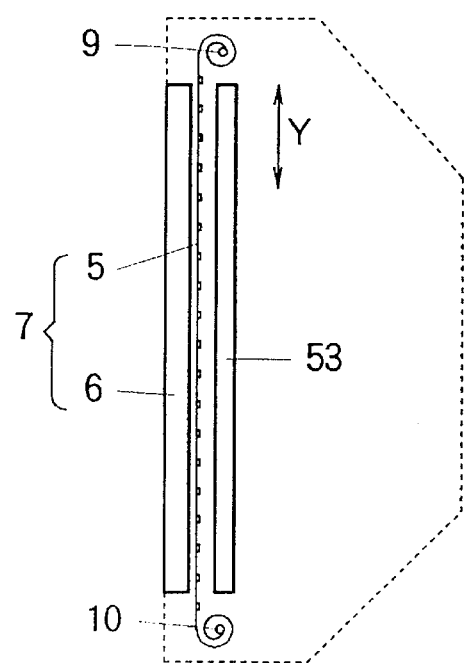
FIG. 14 is a schematic side view of a projection display apparatus according to a fifth embodiment of this invention.

FIG. 14 schematically shows a side view of a projection display apparatus according to a fifth embodiment of this invention. In the apparatus according to the fifth embodiment, the same reference numerals are used to denote parts of the construction that are the same as those of FIG. 1A. The apparatus of the fifth embodiment differs from that of the first embodiment in that it is provided with a transparent plate 53 made of transparent acryl, glass or the like that presses the sheet-like Fresnel lens 5 against the diffusing plate 6. In this case, as the Fresnel lens 5 slides between the diffusing plate 6 and transparent plate 53, there are no excessive gaps between the Fresnel Lens 5 and the diffusing plate 52, and creasing is prevented. Further, if the displacing mechanism is disposed so as to press the sheet-like Fresnel lens 5 against the transparent plate 53, creasing and deterioration of image quality are still more definitively prevented.

Sixth Embodiment

Figure 15:
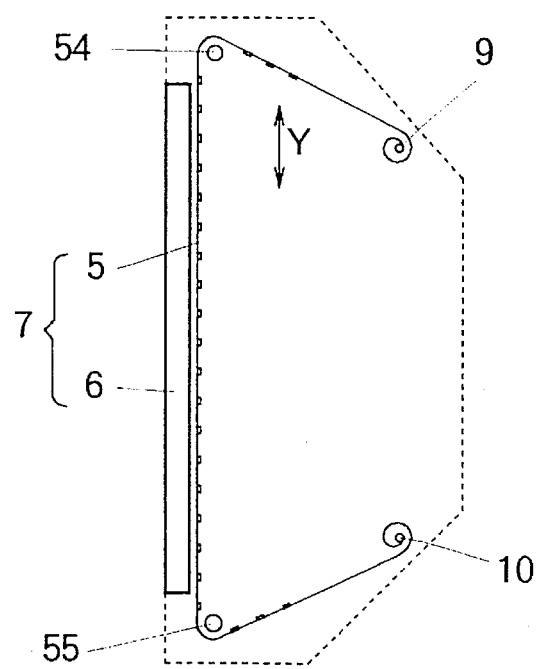
FIG. 15 is a schematic side view of a projection display apparatus according to a sixth embodiment of this invention.

FIG. 15 schematically shows a side view of a projection display apparatus according to a sixth embodiment of this invention. In the apparatus according to the sixth embodiment, the same reference numerals are used to denote parts of the construction that are the same as those of FIG. 1. The only difference from the first embodiment is that the apparatus comprises a pair of supports 54 and 55 for guiding the Fresnel lens 5, these supports being disposed above and below (or to the left and right) of the diffusing plate 6 in the cabinet 1, a pair of rollers 9 and 10 for winding the Fresnel lens 5 guided by the supports 54 and 55, these rollers being situated at the rear of the cabinet 1 (on the right-hand side of FIG. 14), and drive means for rotating the rollers. Due to this arrangement, almost no space is required for the drive mechanism at the edges of the screen, and the height of the apparatus can be further reduced. The construction of FIG. 15 may be applied also to the apparatus shown in FIG. 5 and to the apparatus shown in FIG. 6. The remaining features of the sixth embodiment are identical to those of the first embodiment.

Seventh Embodiment

Figure 16:
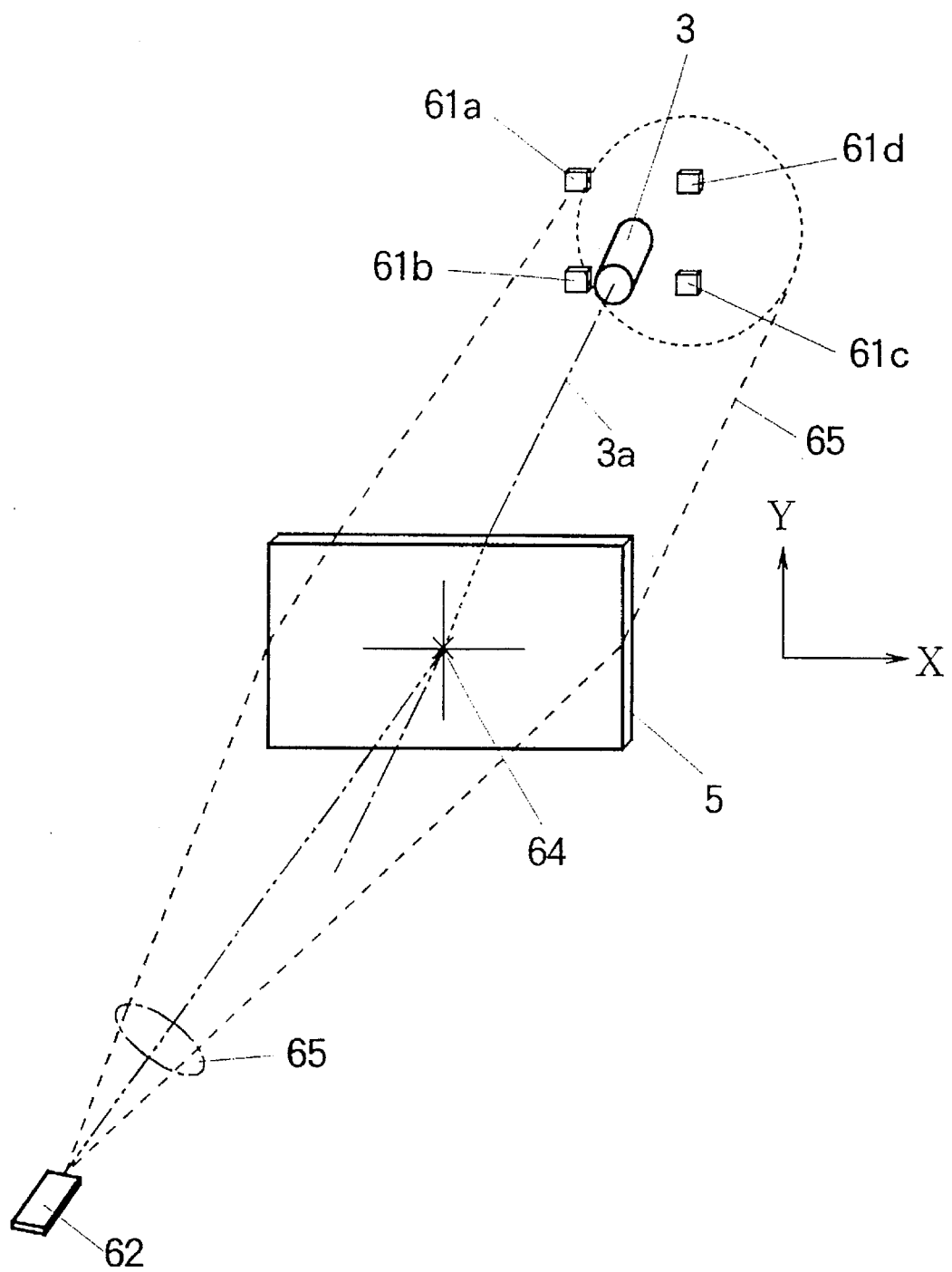
FIG. 16 is a schematic perspective view of a projection display apparatus according to a seventh embodiment of this invention.
Figure 17:
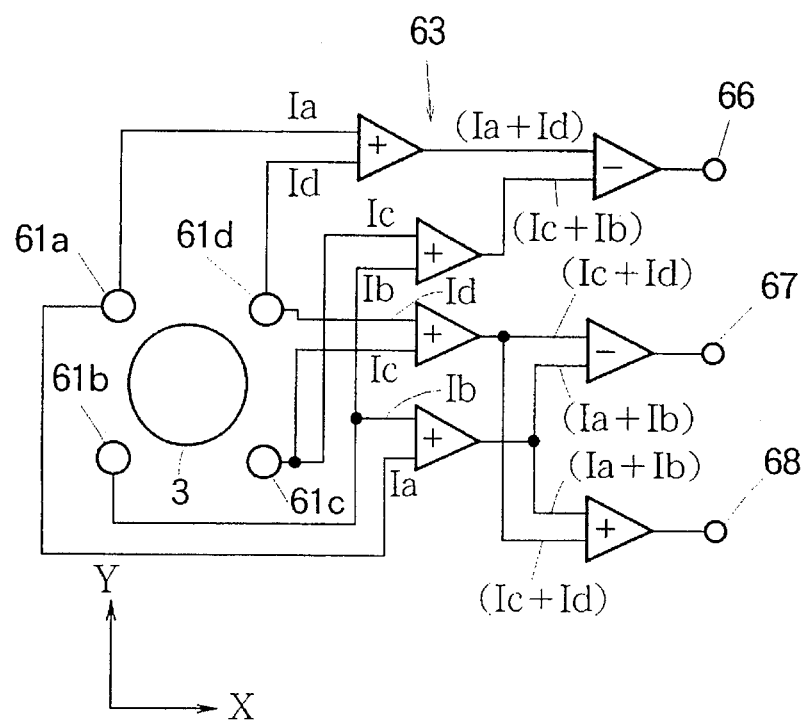
FIG. 17 is a circuit diagram showing a computing circuit according to the seventh embodiment.

FIG. 16 is a schematic view of the construction of a projection display apparatus according to a seventh embodiment of this invention. FIG. 17 is a circuit diagram off the seventh embodiment. The apparatus according to the seventh embodiment is provided with two pairs of light detectors 61a and 61c and light detectors 61b and 61d at the rear of the Fresnel lens 5 disposed in symmetrical positions with respect to the center of the projecting lens 3. The light detectors 61a, 61b, 61c and 61d outputting signals $I_a$, $I_b$, $I_c$ and $I_d$ having magnitudes depending on the intensity of an incident infrared beam from an infrared controller 62. The detectors 61a, 61b, 61c and 61d are moreover disposed near to the projecting lens 3. According to the seventh embodiment, the direction and extent of displacement of the Fresnel lens due to the displacing mechanism is determined based on differences in the magnitudes of the signals output by the detectors 61a, 61b, 61c and 61d. This computation is performed for example by a computing circuit 63 shown in FIG. 17.

If a center 64 of the Fresnel lens 5 is in a reference state wherein it coincides with the center off the screen (optical axis 3a of the projecting lens 3), and an infrared ray beam 65 is incident effectively perpendicular to the screen, the detectors 61a, 61b, 61c and 61d detect an infrared ray of effectively the same intensity. On the other hand, if the infrared ray beam 65 is incident obliquely from the side as shown in FIG. 16, the emergent beam irradiates mainly a position that is horizontally offset from the installation positions of the detectors 61a, 61b, 61c and 61d, so the light amount detected by the detectors 61c and 61d is greater than the light amount detected by the detectors 61a and 61b.

The incidence angle of the beam 65 in the horizontal direction (X direction) may therefore be detected by computing a differential output 66, equal to $(I_a+I_b)-(I_c+I_d)$, from the outputs $I_a$, $I_b$, $i_c$ and $I_d$ of the four detectors $61_a$, $61_b$, $61_c$ and $61_d$, as shown in FIG. 17. Further, the incidence angle in the up-down direction (Y direction) may be detected by computing a differential output 67, equal to $(I_a+I_d)-(I_b+I_c)$. If the drive mechanism is driven based on these computation results, the projected center beam from the screen can be directed in the direction from which the infrared ray is emitted without giving any commands related to the extent and direction of displacement of the Fresnel lens. In other words, a bright projected beam can be directed at the viewer 13 having an infrared controller that emits the infrared ray signal 65, and it is moreover unnecessary to superpose any control signal on the infrared ray signal 65 to adjust the position of the Fresnel lens.

According to this embodiment, therefore, there is no need to provide the infrared controller 62 with a special electrical circuit means for emitting signals to command the driven amount and direction of the Fresnel lens, it being sufficient to transmit a signal such as is used for changing a TV channel or a sound volume. Further, the operation may be performed according to commands based on an output 68 equal to $(I_a+I_b+I_c+I_d)$.

Figure 18:
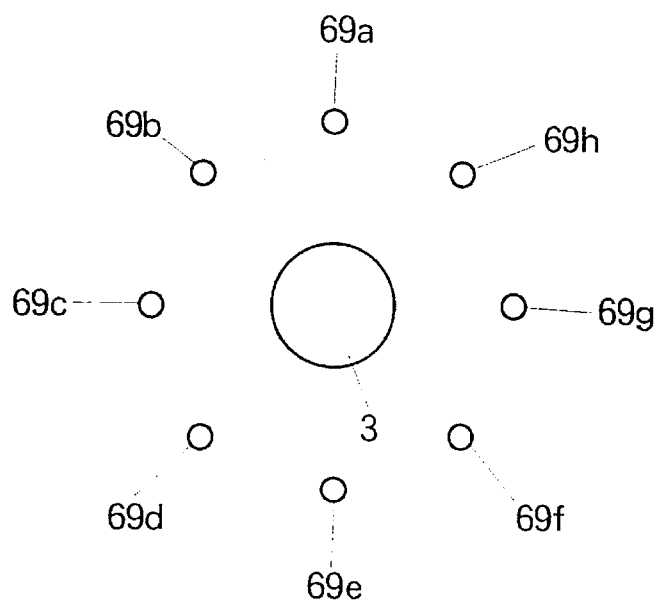
FIG. 18 is an illustrative diagram showing a ease where eight light detectors 69a–69h are arranged according to the seventh embodiment.

Eight detectors $69a$ to $69h$ may also be provided as shown in FIG. 18. In this case, the approximate incidence direction of the infrared ray may be known without need or any special computation by comparing the outputs of detectors on opposite sides off the projecting lens 3 (e.g. $69a$ and $69e$).

Eighth Embodiment

Figure 19:
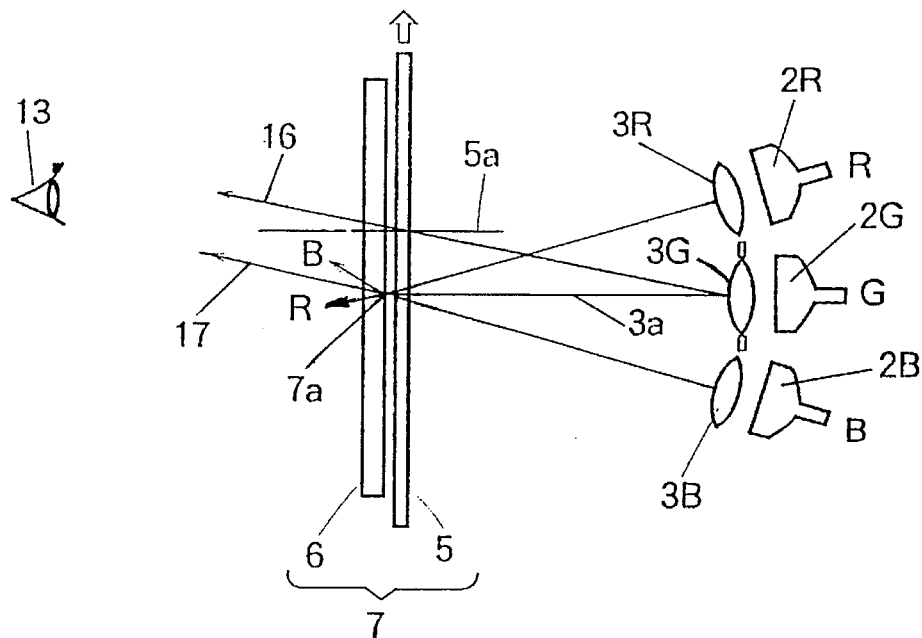
FIG. 19 is a schematic view of the construction of a projection display apparatus according to an eighth embodiment of this invention.

In the aforesaid embodiments, the picture source 2 and projecting lens 3 were combined in a simplified optical system, however the invention may be applied also to an ordinary three tube projecting optical system using CRTs 2R, 2G and 2B and projecting lenses 3R, 3G and 3B for displaying images off the colors red (R), green (G) and blue (B), as shown in FIG. 19. In this case, the optical axes of the projecting lenses 3R, 3G and 3B intersect effectively at the center $7a$ of the screen 7. The brightest emergent light 17 can therefore be directed in the beam direction 16 by shifting the position of the optical axis off the central, green optical system, and of the optical axis $5a$ of the Fresnel lens 5, so that the same effect is obtained as in the aforesaid embodiments. The red and blue beams may also be directed towards the viewer 13 along the green projected beam so that there is no loss of uniformity of color.

Ninth Embodiment

Figure 20:
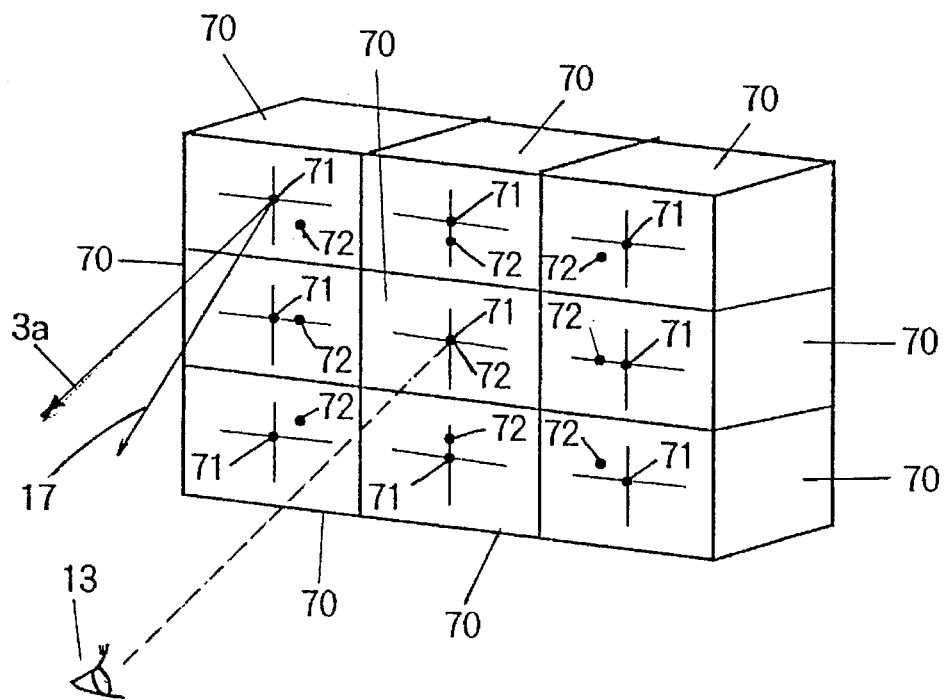
FIG. 20 is a schematic perspective view of the construction of a projection display apparatus according to a ninth embodiment of this invention.

FIG. 20 is a perspective view showing the construction of a multi-display apparatus assembly according to a ninth embodiment of this invention. In this assembly, nine projection display apparatuses according to the aforesaid embodiments are arranged adjacent to each other such that their screens are in the same piano. In the figure, 71 is a screen center of each off a projection display apparatus 70, and 72 is an optical axis center of each of a Fresnel lens (not shown). The apparatuses 70 each comprise the Fresnel lens and a displacing mechanism, the positions of the centers 72 of the Fresnel lenses being adjusted to be nearer the inside of the assembly than the centers 71 of the screens. The extents of displacement of the Fresnel lenses may be set such that, when a typical viewer 13 is in front of the center apparatus 70, the central light beams 17 from the other apparatuses 70 are directed towards the viewer 13. In the multi-display assembly according to this embodiment, although the viewing angle of the viewer 13 is different in the case of each of the apparatuses 70, a picture having effectively the same brightness can be viewed from all of them. Further, the extents of displacement of the Fresnel lenses may be adjusted for any position of the viewer according to the size of the room in which the multi-display assembly is installed.

In the aforesaid description, the first to ninth embodiments are described, but the above-mentioned embodiments can be combined with each other.

What is claimed is:

1. A projection display apparatus comprising:

a picture source;

a projecting lens for projecting an enlarged image of said picture source;

a first Fresnel lens forming a part of a screen and having a converging effect;

a diffusing plate forming a part of said screen, said diffusing plate forming an image that has been enlarged by said projecting lens and passed through said first Fresnel lens;

displacing means for displacing said first Fresnel lens; and display means for displaying information related to the direction and extent of displacement of said first Fresnel lens displaced by said displacing means.

2. A projection display apparatus as defined in claim 1, wherein said displacing means displaces a part of said first Fresnel lens facing said diffusing plate in a plane parallel to said diffusing plate, in a left-right direction parallel to a horizontal direction of said projection display apparatus, in an up-down direction perpendicular to the horizontal direction, or in both of said left-right and said up-down directions; and wherein said display means displays information related to the extend and direction of displacement of said first Fresnel lens displaced by said displacing means on said screen.

3. A projection display apparatus as defined in claim 2, wherein said first Fresnel lens is film-like, and wherein said displacing means includes
      a pair of first rollers provided above and below or to the left and right of said diffusing plate for winding said first Fresnel lens, and
      first drive means for rotating said first rollers.

4. A projection display apparatus as defined in claim 3, further comprising:

a second Fresnel lens, and wherein said displacing means further includes
      a pair of second rollers that displaces said second Fresnel lens in a direction perpendicular to the direction of displacement of said first Fresnel lens, and
      second drive means for rotating said second rollers.

5. A projection display apparatus as defined in claim 1, further comprising:

a cabinet housing said picture source, said projecting lens, said first Fresnel lens, and said diffusing plate; and wherein said displacing means includes
      a pedestal supporting said cabinet such that said cabinet can rotate about a predetermined rotation shaft, and
      a drive means for rotating said cabinet about said pedestal.

6. A projection display apparatus as defined in claim 1, wherein said displacing means includes
      a frame fixed to an outer circumference of said first Fresnel lens,
      a driven gear provided on said frame,
      a drive gear that engages with said driven gear, and
      drive means for rotating said drive gear.

7. A projection display apparatus as defined in claim 1 further comprising:

light detecting means disposed behind said first Fresnel lens in the vicinity of said projecting lens for detecting incident infrared rays that have passed through said first Fresnel lens from an infrared ray controller.

8. A projection display apparatus as defined in claim 1 further comprising:

at least two light detecting members disposed behind said first Fresnel lens at symmetrical positions about a predetermined reference position, said light detecting members outputting signals of which the magnitude depends on the intensity of infrared rays incident upon said light detecting members;

computing means for determining the direction and extent of displacement of said first Fresnel lens by said displacing means based on the difference in magnitude of signals output by said light detecting members when infrared rays are emitted from an infrared ray controller; and controlling means for controlling the action of said displacing means based on the direction and extent of displacement obtained by said computing means.

9. A projection display apparatus comprising:

a picture source;

a projecting lens for projecting an enlarged image of said picture source;

a Fresnel lens forming a part of a screen, said Fresnel lens having a converging effect;

a diffusing plate forming a part of said screen, said diffusing plate forming an image that has been enlarged by said projecting lens and passed through said Fresnel lens; and displacing means for displacing a part of said Fresnel lens facing said diffusing plate in a plane parallel to said diffusing plate in both a left-right direction parallel to a horizontal direction of said projection display apparatus, and in an up-down direction perpendicular to the horizontal direction.

10. A projection display apparatus as defined in claim 9, wherein said displacing mans includes a frame fixed to an outer circumference of said Fresnel lens, a driven gear provided on said frame, a drive gear that engages with said driven gear, and drive means for rotating said drive gear.

11. A projection display apparatus as defined in claim 9 further comprising:

display means for displaying information related to the direction and extent of displacement of said Fresnel lens displaced by said displacing means.

12. A projection display apparatus as defined in claim 9 further comprising:

light detecting means disposed behind said Fresnel lens in the vicinity of said projecting lens for detecting incident infrared rays that have passed through said Fresnel lens from an infrared ray controller.

13. A projection display apparatus as defined in claim 9 further comprising:

at least two light detecting members disposed behind said Fresnel lens at symmetrical positions about a predetermined reference position, said light detecting members outputting signals of which the magnitude depends on the intensity of infrared rays incident upon said light detecting members;

computing means for determining the direction and extent of displacement of said Fresnel lens by said displacing means based on the different in magnitude of signals output by said light detecting members when infrared rays are emitted from said infrared ray controller; and controlling means for controlling the action of said displacing means based on the direction and extent of displacement obtained by said computing means.

14. A projection display apparatus comprising:

a picture source;

a projecting lens for projecting an enlarged image of said picture source;

a Fresnel lens forming a part of a screen, said Fresnel lens having a converging effect;

a diffusing plate forming a part of said screen, said diffusing plate forming an image that has been enlarged by said projecting lens and passed through said Fresnel lens;

displacing means for displacing a part of said Fresnel lens facing said diffusing plate in a plane parallel to said diffusing plate, in a left-right direction parallel to a horizontal direction of said projection display apparatus, in an up-down direction perpendicular to the horizontal direction, or in said left-right and up-down directions; and a transparent plate enclosing said Fresnel lens between said transparent plate and said diffusing plate;

wherein said Fresnel lens slides on said transparent plate when said Fresnel lens is displaced.

15. A projection display apparatus as defined in claim 14 further comprising:

display means for displaying information related to the direction and extent of displacement of said Fresnel lens displaced by said displacing means.

16. A projection display apparatus as defined in claim 14 further comprising:

light, detecting means disposed behind said Fresnel lens in the vicinity of said projecting lens for detecting incident infrared rays that have passed through said Fresnel lens from an infrared ray controller.

17. A projection display apparatus as defined in claim 14 further comprising:

at least two light detecting members disposed behind said Fresnel lens at symmetrical positions about a predetermined reference position, said light detecting members outputting signals of which the magnitude depends on the intensity of infrared rays incident upon said light detecting members;

computing means for determining the direction and extent of displacement of said Fresnel lens by said displacing means based on the difference in magnitude of signals output by said light detecting members when infrared rays are emitted from said infrared ray controller; and controlling means for controlling the action of said displacing means based on the direction and extent of displacement obtained by said computing means.

18. A projection display apparatus comprising:

a cabinet;

a picture source provided in said cabinet;

a projecting lens provided in said cabinet for projecting an enlarged image of said picture source;

a Fresnel lens forming a part of a screen and having a converging effect;

a diffusing plate forming a part of said screen, said diffusing plate forming an image of a picture that has been enlarged by said projecting lens and passed through said Fresnel lens;

a pair of supports provided above and below or to the left and right of said diffusing plate in said cabinet for the purpose of guiding said Fresnel lens;

a pair of rollers provided at the rear of said cabinet and between said pair of supports for winding said Fresnel lens guided by said supports; and drive means for rotating said rollers.

19. A projection display apparatus as defined in claim 18 further comprising:

display means for displaying information related to the direction and extent off displacement of said Fresnel lens displaced by said displacing means.

20. A projection display apparatus as defined in claim 18 further comprising:

light detecting means disposed behind said Fresnel lens in the vicinity of said projecting lens for detecting incident infrared rays that have passed through said Fresnel lens from an infrared ray controller.

21. A projection display apparatus as defined in claim 18 further comprising:

at least two light detecting members disposed behind said Fresnel lens at symmetrical positions about a predetermined reference position, said light detecting members outputting signals of which the magnitude depends on the intensity of infrared rays incident upon said light detecting members;

computing means for determining the direction and extent of displacement of said Fresnel lens by said displacing means based in the difference in magnitude of signals output by said light detecting members when infrared rays are emitted from said infrared ray controller; and controlling means for controlling the action of said displacing means based on the direction and extent of displacement obtained by said computing means.

22. A projection display apparatus comprising:

a picture source;

a projecting lens for projecting an enlarged image of said picture source;

a Fresnel lens forming a part of a screen, said Fresnel lens having a converging effect;

a diffusing plate forming a part of said screen, said diffusing plate forming an image that has been enlarged by said projecting lens and passed through said Fresnel;

displacing means for displacing a part of said Fresnel lens facing said diffusing plate in a plane parallel to said diffusing plate, in a left-right direction parallel to a horizontal direction of said projection display apparatus, in an up-down direction perpendicular to the horizontal direction, or in said left-right and up-down directions;

at least two light detecting members disposed behind said Fresnel lens at symmetrical positions about a predetermined reference position, said detecting members outputting signals of which the magnitude depends on the intensity of infrared rays incident upon them, computing means for determining the direction and extent of displacement of said Fresnel lens by said displacing means based on the difference of magnitude of signals output by said light detecting members when infrared rays are emitted from said infrared ray controller; and controlling means for controlling the action of said displacing means based on the direction and extent of displacement obtained by said computing means.

23. A projection display apparatus comprising:

a first picture source;

a second picture source arranged in a position horizontal to said first picture source;

a third picture source arranged in a position horizontal to said second picture source;

a first projecting lens for projecting an enlarged image of said first picture source;

a second projecting lens for projecting an enlarged image of said second picture source;

a third projecting lens for projecting an enlarged image of said third picture source;

a Fresnel lens forming a part of a screen, said Fresnel lens having a converging effect;

a diffusing plate forming a part of said screen, said diffusion plate forming an image that has been enlarged by said projecting lens and passed through said Fresnel lens;

displacing means for displacing a part of said Fresnel lens facing said diffusing plate in a plane parallel to said diffusing plate, in a left-right direction parallel to a horizontal direction of said projection display apparatus in an up-down direction perpendicular to the horizontal direction, or in said left-right and up-down directions;

at least two light detecting members disposed behind said Fresnel lens at symmetrical positions about said second projecting lens, said light detecting members outputting signals of which the magnitude depends on the intensity of infrared rays incident upon them;

computing means for determining the direction and extent of displacement of said Fresnel lens by said displacing means based on the difference of magnitude of signals output by said light detecting members when infrared rays are emitted from said infrared ray controller; and controlling means for controlling the action of said displacing means based on the direction and extent of displacement obtained by said computing means.

24. A multi-display apparatus comprising a plurality of projection display apparatuses according to claim 1 arranged such that their screens are aligned in the same plane.

25. A multi-display apparatus comprising a plurality of projection display apparatuses according to claim 9 arranged such that their screens are aligned in the same plane.

26. A multi-display apparatus comprising a plurality of projection display apparatuses according to claim 14 arranged such that their screens are aligned in the same plane.

27. A multi-display apparatus comprising a plurality of projection display apparatuses according to claim 18 arranged such that their screens are aligned in the same plane.

28. A multi-display apparatus comprising a plurality of projection display apparatuses according to claim 22 arranged such that their screens are aligned in the same plane.

29. A multi-display apparatus comprising a plurality of projection display apparatuses according to claim 23 arranged such that their screens are aligned in the same plane.

* * * * *